United States Patent
Geurts et al.

(10) Patent No.: US 9,910,502 B2
(45) Date of Patent: Mar. 6, 2018

(54) GESTURE-BASED USER-INTERFACE WITH USER-FEEDBACK

(75) Inventors: Lucas Jacobus Franciscus Geurts, Best (NL); Johan Partomo Djajadiningrat, Utrecht (NL); Jeanne De Bont, Eindhoven (NL); Pei-Yin Chao, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 346 days.

(21) Appl. No.: 14/239,608

(22) PCT Filed: Sep. 3, 2012

(86) PCT No.: PCT/IB2012/054530
§ 371 (c)(1),
(2), (4) Date: Feb. 19, 2014

(87) PCT Pub. No.: WO2013/038293
PCT Pub. Date: Mar. 21, 2013

(65) Prior Publication Data
US 2014/0237432 A1    Aug. 21, 2014

Related U.S. Application Data

(60) Provisional application No. 61/534,935, filed on Sep. 15, 2011.

(51) Int. Cl.
G06F 3/01 (2006.01)
G06F 3/00 (2006.01)
G06F 3/03 (2006.01)

(52) U.S. Cl.
CPC .............. *G06F 3/017* (2013.01); *G06F 3/005* (2013.01); *G06F 3/0304* (2013.01)

(58) Field of Classification Search
CPC ..... G06F 3/0481; G06F 3/04883; G06F 3/017
(Continued)

(56) References Cited

U.S. PATENT DOCUMENTS 5,034,986 A   7/1991   Karmann
5,594,469 A * 1/1997   Freeman .............. G05B 19/106
                                                   345/157

(Continued)

FOREIGN PATENT DOCUMENTS

EP    0385384 A2    9/1990
EP    0905644 A2    3/1999
(Continued)

OTHER PUBLICATIONS

Sims, Particle Animation and Rendering Using Data Parallel Computing, Computer Graphics, vol. 24, No. 4, Aug. 1990, pp. 405-413.
(Continued)

*Primary Examiner* — Haoshian Shih

(57) ABSTRACT

A system has a contactless user-interface through which a user controls a functionality of the system. The contactless user-interface has a detector sub-system and a user-feedback sub-system. The contactless user-interface has an alert mode and a control mode. In the alert mode, the user-feedback sub-system has a display monitor to provide a visible acknowledgement to the user, in response to the detector sub-system having detected the presence of the user within a an alert range. The contactless user-interface transitions from the alert mode to the control mode in response to the detector sub-system detecting an initialization gesture of the user. In the control mode, the contactless user-interface controls the functionality in response to the detector sub-system detecting a control gesture of the user. The visible acknowledgement is made to mirror the movements of the user.

21 Claims, 6 Drawing Sheets

(58) Field of Classification Search
USPC .......................................... 715/863; 345/174
See application file for complete search history.

(56) References Cited

U.S. PATENT DOCUMENTS

| | | |
|---|---|---|
| 2003/0095154 A1 | 5/2003 | Colmenarez |
| 2004/0066918 A1 | 4/2004 | Sifuentes |
| 2007/0124694 A1 | 5/2007 | Van De Sluis et al. |
| 2008/0253519 A1 | 10/2008 | Bonfiglio et al. |
| 2009/0153474 A1 | 6/2009 | Quennesson |
| 2010/0162177 A1 | 6/2010 | Eves et al. |
| 2010/0199228 A1 | 8/2010 | Latta et al. |
| 2010/0269072 A1 | 10/2010 | Sakata et al. |
| 2010/0281436 A1 | 11/2010 | Kipman et al. |
| 2011/0102570 A1 | 5/2011 | Wilf et al. |
| 2011/0119640 A1 | 5/2011 | Berkes et al. |
| 2011/0310050 A1* | 12/2011 | Chiang .................. G06F 3/017 345/174 |
| 2012/0313848 A1* | 12/2012 | Galor .................... G06F 3/005 345/156 |
| 2015/0227208 A1* | 8/2015 | Blevins .............. G06F 3/04883 715/863 |

FOREIGN PATENT DOCUMENTS

| | | |
|---|---|---|
| JP | 2006338328 A | 12/2006 |
| JP | 2010066971 A | 3/2010 |
| JP | 2010079662 A | 4/2010 |
| JP | 2011208479 A | 4/2010 |
| WO | 2009128064 A2 | 10/2009 |
| WO | 2010033086 A1 | 3/2010 |

OTHER PUBLICATIONS

Szeliski et al, "Modeling Surfaces of Arbitrary Topology With Dynamic Particles", IEEE Computer Society Confernce on Computer Vision and Pattern Recognition, Proceedings CVPR, 1993, pp. 82-87.

Jota et al, "The Continuous Interaction Space: Interaction Techniques Unifying Touch and Gesture on and Above a Digital Surface", Research Report 2011-993-05, Department of Computer Science, University of Calgary, 2011, pp. 1-16.

Thimbleby et al, "A Novel Gesture-Based Calculator and Its Design Principles", Department of Computer Science, University of Wales Swansea, 2005, pp. 1-4.

* cited by examiner

GESTURE-BASED USER-INTERFACE WITH USER-FEEDBACK

This application is the U.S. National Phase application under 35 U.S.C. § 371 of International Application No. PCT/IB2012/054530, filed Sep. 3, 2012, which claims the benefit of U.S. Provisional Patent Application No. 61/534,935. These applications are hereby incorporated by reference herein.

FIELD OF THE INVENTION

The invention relates to a system with a contactless user-interface configured for a user controlling a functionality of the system through contactless interaction with the contactless user-interface. The invention further relates to a user-interface for use in such a system, to control software on a computer-readable medium configured for use on such a system, and to a method of enabling a user to control a functionality of such system through contactless interaction with the system.

BACKGROUND ART

User-interfaces are well in the field of man-machine interaction. A user-interface of a system, e.g., an appliance, a mechanical system, a computing system, an electronic system, etc., is designed to enable a human being to operate or control the system in operational use, or to configure the system for operational use. The term "system", as used throughout this text, is meant to cover equipment for industrial or professional application, equipment for office or business application, medical equipment, equipment for domestic application, consumer electronics equipment, etc.

A particular type of user-interface is a contactless user-interface, whose operation is based on the detection of a motion or movement of the user who is not in haptic contact with the contactless user-interface. Examples of such a contactless user-interface, known in the art, are a gesture-based user-interface and a motion-tracking user-interface.

A gesture-based user-interface interprets human gestures that originate from any bodily motion, typically from the face of the user or a hand of the user. See, e.g., US patent application publication 20030095154 "Method and Apparatus for a Gesture-based User-interface", US patent application publication 20070124694 "Gesture to Define Location, Size, and/or Content of Content Window on a Display", US patent application publication 20080253519 "Automatic Control of a Medical Device", US patent application publication 20100162177 "Interactive Entertainment System and Method of Operation thereof", all assigned to Koninklijke Philips Electronics N.V., and incorporated herein by reference.

A motion-tracking user-interface tracks the movement of an object, e.g., the user's head or a stylus held in the user's hand. The motion-tracking user-interface translates the movement of the object to a movement of a pointer displayed on the screen of a display monitor and interprets the presence of the pointer within a specific zone of the screen as a specific command. See, e.g., US patent application publication 20090153474 "Motion Tracking User Interface", Assigned to Apple, Inc., and incorporated herein by reference.

Operation of a contactless user-interface, whose operation is based on the detection of a motion or movement of the user, is typically based on pattern-recognition of the user-input captured by, e.g., one or more video cameras, one or more optical sensors, or one or more ultrasound sensors.

Contactless user-interfaces do not require physical contact between the user and a surface of the contactless user-interface. As a result, a contactless user-interface is less prone to wear, to being physically damaged, or to accumulating dirt at the surface, than are user-interfaces that do require a physical contact between the user and the surface. A contactless user-interface is also more hygienic from the operator's point of view as physical contact is not required.

SUMMARY OF THE INVENTION

The inventors have recognized that typical, known, implementations of the contactless user-interface have several drawbacks. One drawback relates to the fact that user-interaction with the contactless user-interface may give rise to false positives, false negatives, and input errors. A false positive occurs when an unintended movement of the user is interpreted as a specific gesture to provide specific user-input to the system. A false negative occurs when a deliberate movement of the user fails to get interpreted as a specific gesture to provide specific user-input to the system. An interpretation error occurs when a deliberate movement of the user is incorrectly interpreted and is mapped to the incorrect user-input to the system. Another drawback relates to the fact that the user may be left in a state of uncertainty for a while if the system does not seem to respond to the gesture. The user may even wonder whether the power supply has failed, or whether the system has broken down, etc.

According to the inventors, studies show that users of a system with such a contactless user-interface typically seek confirmation of the current status of the system to understand what has gone wrong, if the system gives a false positive response, a false negative response, an incorrect response or no response at all.

Known systems, whose user-input is based on gesture recognition, typically present a representation of what the user-interface is actually sensing or capturing on a screen of a display monitor that at the same time is also being used to track the system's current operation or status. Accordingly, the display monitor is being used in dual-mode operation: presenting the current operation of the system in a first window as well as presenting the user-input being sensed or captured in a second window. Such a dual-mode configuration has a number of disadvantages. A first disadvantage is that the dual-mode configuration needs screen real-estate. That is, the dual-mode configuration imposes constraints on the minimum size of the screen so as to be large enough in order to provide meaningful visual feedback to the user in each of the first window and second window. A second disadvantage relates to the ergonomic aspect of the dual-mode configuration, as the user has to pay attention to two sources of information at the same time: the first window and the second window being present on the same screen of the display monitor at the same time. This is believed to be confusing, as the user has repeatedly to switch mentally between controlling the current operation of the system and verifying the current user-input to the system. A professional may be trained to do this intuitively when interacting with professional equipment such as a fighter plane, but this approach is less attractive to users of everyday consumer products.

The inventors propose a system with a gesture-based, contactless user-interface wherein the contactless user-interface visualizes the dialogue between the user and the system in a more ergonomic way. More specifically, the inventors propose a system with a contactless user-interface. The contactless user-interface is configured for a user's controlling a functionality of the system through contactless interaction with the contactless user-interface. The contactless user-interface has a detector sub-system and a user-feedback sub-system. The contactless user-interface is configured for operating in an alert mode or in a control mode. In the alert mode, the contactless user-interface is configured for controlling the user-feedback sub-system to provide an acknowledgement to the user, in response to the detector sub-system having detected a presence of the user within a pre-determined alert range. The contactless user-interface is configured for transitioning from the alert mode to the control mode in response to the detector sub-system detecting a pre-determined initialization gesture made by the user within the pre-determined alert range. In the control mode, the contactless user-interface is configured for controlling the functionality in response to the detector subsystem detecting a pre-determined control gesture of the user carried out within the pre-determined alert range.

The system in the invention may be implemented as a geographically concentrated entity such as an apparatus or a device. Alternatively, the system in the invention is a geographically distributed system, with entities that are spatially dispersed and that communicate via a data network, such as, e.g., a local area network (LAN) or the Internet.

The term "functionality" as used in this text, refers to one or more attributes characterizing the functioning of the system in operational use. The one or more attributes are controllable through the pre-determined control gesture. For example, the system comprises an audio function with one or more of the following attributes: an intensity (volume) of the sound being reproduced, a directional character of the sound being reproduced in a stereo implementation of the audio function, the level of treble or of bass in the sound being reproduced, an item of audio being played out and having been selected from a playlist of multiple of such items, a radio channel currently tuned into, etc. As another example, the system comprises a video function with one or more of the following attributes: a brightness of the images being played out on a display monitor, contrast in the images being played out on the display monitor, color adjustment of the images being played out, a resolution of the images being played out in a part of the screen of the display monitor, an item of video being played out and having been selected from a playlist of such video items, an image being displayed and having been selected from a collection of pre-stored images, a TV channel currently tuned into, etc. As another example, the system comprises a lamp such as a wake-up light, or a lamp to illuminate a dinner table, or a searchlight mounted on a vehicle of an emergence service, etc. The lamp has one or more of the following attributes: an on-state and an off-state; a brightness of the light emitted, a direction of the light emitted, a color temperature of the light emitted, a focus of the light emitted, etc. As yet another example, the system comprises a domestic appliance such as a kitchen stove or a microwave oven. The operation of the domestic appliance has one or more of the following attributes: an intensity of the heat generated, a pre-set length of the time-period during which heat is generated, a specific one of multiple burners or of multiple coils selected to produce the heat, etc. Above examples merely illustrate the field of application of contactless user-interfaces and should not be interpreted as an exhaustive list of applications, neither with regard to the type of system, nor with regard to the attributes controllable through the contactless user-interface.

When the contactless user-interface is operating in the alert mode, the user-feedback sub-system provides an acknowledgement to the user, in response to the detector sub-system having detected the presence of the user within a pre-determined alert range. That is, when the user, or part of his/her body, has come within the alert range of the detector sub-system, the user-feedback sub-system acknowledges to the user that his/her presence has been detected. The acknowledgement serves as a feedback to the user and makes the user aware of the fact that the detector sub-system has noticed the user and that he/she is now within the alert range. When the user, or a bodily part of the user, is within the alert range, the contactless user-interface responds to the pre-determined initialization gesture of the user and transitions to the control mode. In the control mode, the user is given control over the functionality of the system via user-interaction with the contactless user-interface. In the control mode, the contactless user-interface responds to the pre-determined control gesture by controlling the functionality of the system in accordance with the pre-determined control gesture.

As specified above, operation of the contactless user-interface transitions from the alert mode to the control mode in response to the detector sub-system detecting the pre-determined initialization gesture. The pre-determined initialization gesture comprises, for example, the user keeping his/her hand steady for a pre-determined length of time, e.g., a few seconds, relative to the contactless user-interface. As another example, the pre-determined initialization gesture comprises the user waving his/her hand in front of the contactless user-interface at a frequency that is higher than a pre-determined threshold. As yet another example, the pre-determined initialization gesture is a movement of the user's hand along a path (or: a trajectory) in three-dimensional space, the path having one or more pre-determined spatial characteristics.

A gesture is a deliberate movement of a position of the user's hand, or arm, or head, or body. An actual movement of, e.g., the user's hand includes a change of position of the hand relative to some reference position, a change of orientation of the hand relative to a reference orientation, and a change of the shape of the hand relative to a reference shape. In practice, therefore, an actual movement cannot be repeated exactly with an accuracy of, say a few millimeters in each of the dimensions characterizing the movement. The expression "pre-determined initialization gesture", as used in this text, refers therefore to a specific class of multiple gestures that are all interpreted by the detector sub-system as representative of the pre-determined initialization gesture. For example, consider the center of gravity of the user's hand and consider a gesture as characterized by the directed path traversed by the center of gravity of the user's hand in a three-dimensional space. The detector sub-system may then be configured to determine the main spatial vector component of the directed path. The directed path can be represented by a three-dimensional vector that connects the starting position of the path with the current position of the path. While the user is carrying out the gesture, the three-dimensional vector changes. The main spatial vector component is then the specific one of the three vector components, which has the largest magnitude. If the magnitude of the main spatial component lies within a pre-determined range of magnitudes, the gesture is interpreted as being the pre-determined initialization gesture. Alternative procedures may be implemented in order to determine whether an actual gesture as detected should be interpreted as the pre-determined initialization gesture. Similar considerations apply to the feature "pre-determined control gesture. Gesture-based user-interfaces are well known in the art and are operative to discriminate between different user inputs in the form of different gestures. The discriminating between gestures is known in the art and is, therefore, not addressed in further detail in this text.

In an embodiment of the system, the user-feedback sub-system is configured to provide to the user control feedback on a change in a status of the functionality in response to the pre-determined control gesture.

Accordingly, the user will receive the acknowledgment as a feedback in the alert mode of the contactless user-interface in order to inform the user that he/she has been detected. Gesture control is disabled in the alert mode. Upon the pre-determined initialization gesture, the contactless user-interface transitions to the control mode wherein gesture control is enabled. In the control mode, the user receives control feedback on the status change of the functionality brought about by the pre-determined control gestures. The control feedback comprises, for example, a graphics object representing a slider, a dial, a lever or another familiar physical control device, or a menu of selectable options. The graphics representation is displayed on a display monitor and is changed synchronously with the pre-determined control gesture being carried out by the user. The changing of the graphics object thus mirrors the temporal characteristics of the pre-determined control gesture being carried out. That is, the user-feedback sub-system is configured for dynamically adjusting the control feedback under control of the detector sub-system tracking the user within the alert range. The user-feedback sub-system thus provides feedback to the user in order to confirm, e.g., visually or audibly, the tracking of the user's pre-determined control gesture. At the same time, the functionality of the system is controlled synchronically with the pre-determined control gesture. The feedback mirrors the user's pre-determined control gesture, thus strengthening the user's impression that the system is in contact with the user.

In an embodiment of the system, the user-feedback sub-system is configured for dynamically adjusting the acknowledgement under control of the detector sub-system tracking the user within the alert range.

As specified above, when the contactless user-interface is operating in the alert mode, the user-feedback sub-system provides an acknowledgement to the user, in response to the detector sub-system having detected the presence of the user within a pre-determined alert range. That is, when the user, or part of his/her body, has come within the alert range of the detector sub-system, the user-feedback sub-system acknowledges to the user that his/her presence has been detected.

The acknowledgement feedback to the user may be implemented in a variety of ways. For example, the user-feedback system comprises a small light, e.g., a colored LED, that starts to blink or that lights up when the detector sub-system has detected the user's presence within the alert range. As another example, the user-feedback system comprises an array of small lamps, e.g., an arrangement of multiple LEDs that are repeatedly turned on and off selectively so as to create a rippling effect.

The acknowledgement in the form of repeatedly turning on and off of the LEDs may be made dynamically adjustable in dependence on the movements of the user. The detector sub-system is then tracking the user within the alert range and adjusts the behavior of the LEDs to reflect the user's movements as detected. The rippling effect, mentioned above, may then have a directional characteristic reflecting the main component of a direction from which the user has been detected to move into and/or within the alert range. The arrangement of the multiple LEDs is controlled so as to have the LEDs are turned on or off in synchronism with the movements of the user so as to mirror the movements of the user.

As another example, the user-feedback system comprises a display monitor. The display monitor serves to provide visual information to the user about, e.g., the functioning of the system in operational use. If the system comprises a domestic central heating system or a climate-control system, the display monitor is used to convey to the user information in a graphics format about, e.g., the current ambient temperature, the current relative humidity of the ambient air, whether the heating system or the climate-control system idles or is consuming power. If the system comprises a clock, the display monitor is used, in operational use of the system, to convey to the user the current time of the day by means of, e.g., a graphics representation of an analog clock having a clock face and moving hands, or a graphics representation of a digital clock with numerical representations of the hours and the minutes. Accordingly, the display monitor conveys information with a semantic content to the user in operational use of the system. When the detector sub-system detects the presence of the user, the contactless user-interface controls the system so that the information, being displayed on the display monitor in operational use of the system, is replaced by a dedicated indication to acknowledge to the user that his/her presence has been detected. The replacing may be done in a variety of manners. For example, the information displayed in operational use of the system fades out while the dedicated indication fades in. As another example, the information being displayed in operational use of the system is morphed into the indication. The operation of cross-fading or of morphing shifts the attention of the user smoothly, i.e., non-abruptly, from one state of the contactless user-interface to a next state. This smooth shifting of the attention causes the user to accept by intuition the new state as arising naturally from the preceding state. Thus, the cross-fading or morphing contributes to improving the ergonomic, user-friendliness related, aspects of the contactless user-interface in the invention.

The information being displayed on the display monitor in operational use of the system is then faded or morphed into a collection of graphics particles that move in synchronism with the movements of the user. The mirroring of the movements of the user serves to strengthen the impression of the user that he/she has been detected within the alert range.

The mirroring may have a further psychological effect on the user of which he/she will generally not be aware. The term "mirroring", as used in the field of psychology, refers to social interaction between individuals, in which an individual copies the gestures, body language, facial expressions, or natural language of another individual. Mirroring is typically observed among couples and among close friends. Usually, people readily accept their mirror images and, as a result, mirroring the person with whom one is speaking generally makes the person feel more relaxed and at ease with the other. If an apparatus or a system is mirroring the movements of the user, the user is more likely to feel sympathetic towards the apparatus or system. Accordingly, the mirroring of the user's movements by a graphic's object on the display monitor tends to make the user perceive the system as user-friendly, and tends to make the user feel more emphatic towards the system. The mirroring feature of the contactless user-interface in the alert mode as well as in the control mode can therefore be considered an ergonomic feature that readily speeds-up user-acceptance of the system.

Accordingly, when the contactless user-interface in the invention is in the alert mode, the contactless user-interface responds to the detector sub-system detecting the user or, e.g., the user's hand or leg, within the pre-determined alert range. The contactless user-interface controls the display monitor in the user-feedback sub-system to display an acknowledgment to the user of his/her presence having been noticed. The acknowledgement may be abstract or figurative. For example, assume that the display monitor had been blank or switched off before the user's presence was detected. Upon detection of the user within the pre-determined range, the display monitor is started to display the acknowledgment as a graphics object, e.g., a graphics representation of a human hand, or a graphics representation of an amorphous collection of particles, or the letters of the word "hello", etc. The user-feedback sub-system then controls the graphics object to moves in unison with the user. As another example, assume that the display monitor had been displaying an indicator before the user's presence got detected. For example, the indicator includes a graphics representation of a time-piece to indicate the current time of the day, or a graphics representation of a thermometer indicating the current ambient temperature, or a graphics representation of a piece of audio being currently rendered, etc. Upon detection of the user within the pre-determined range, the user-feedback sub-system controls the display monitor to morph the graphics representation of the indicator into the acknowledgment in the form of a graphics representation of another object, e.g., the graphics representations of a human hand, or of an amorphous collection of particles, or of the word "hello", etc. The contactless user-interface then controls this other graphics object to move in a continuous way and synchronized with the user.

In a further embodiment of a system of the invention, the system has an additional user-interface. The additional user-interface is configured for the user's controlling an additional functionality of the system through physical contact with the additional user-interface. The detector sub-system is operative to inactivate the user controlling the functionality via the contactless user-interface upon detecting the user approaching the additional user-interface in a pre-determined manner.

In this further embodiment, the system is configured for being controlled by the user via the contactless user-interface as well as via the additional user-interface. The additional user-interface requires that the user physically contact the additional user-interface. The additional user-interface comprises, e.g., one or more buttons, and/or one or more dials, and/or one or more sliders, and/or one or more levers, and/or a touch screen. The first-mentioned functionality of the system is user-controllable via the contactless user-interface, and the additional functionality of the system is user-controllable via the additional user-interface. The first-mentioned functionality may be different from the additional functionality. Alternatively, the first-mentioned functionality may be the same as the additional functionality.

If the user has not carried out the pre-determined initialization gesture within the alert range prior to approaching the additional user-interface, the gestures or other movements of the user within the pre-determined alert range will not result in unintended control of the functionality, as the contactless user-interface has not transitioned to the control mode. If the user caused the contactless user-interface to transition to the control mode prior to approaching the additional user-interface, the contactless user-interface would be tracking the movements and gestures of the user within the pre-determined alert range. As a result, the contactless user-interface could then interpret the movements of the user, reaching for the additional user-interface, as the pre-determined control gesture and start controlling the functionality, contrary to the intention of the user. Accordingly, if the detector sub-system detects the user reaching for the control options of the additional user-interface while the contactless user-interface is in the control mode, the detector sub-system inactivates the control mode in order to prevent unintended control of the functionality via the contactless user-interface.

The detector sub-system may be configured in a variety of manners to detect the user reaching for the control options in the additional user-interface. For example, consider a movement or a gesture of the user as a directed path within the pre-determined alert range, as mentioned earlier. If the main vector component of the vector, representing the directed path, lies in the direction from the user towards the additional user-interface, and if the rate of change of this main vector component exceeds a pre-determined threshold magnitude at a certain moment, the detector sub-system interprets the movement or gesture as that the user is reaching for the additional user-interface.

Assume that the contactless user-interface has already started to control the functionality in response to the movement of the user reaching for the control options in the additional user-interface. Preferably, the contactless user-interface is configured for resetting the functionality to the state the functionality had before starting to control the functionality, upon the user actually touching, or actually interacting with, the additional user-interface.

Consider the system having one or more functionalities that can be controlled by the user via the contactless user-interface. The directed path of any respective one of the pre-determined control gestures does preferably not have a vector component in the direction from the user towards the additional user-interface. If the directed path of a particular one of the pre-determined control gestures does have a main vector component along this direction, the contactless user-interface is preferably configured in such as way that the functionality, associated with this particular pre-determined control gesture, is not a critical functionality. The expression "critical functionality", as used herein, refers to a functionality whose unintended control does not lead to damaging the system or to scaring or agitating the user. For example, consider a functionality that includes the adjusting of the volume of the sounds being played out by the system. It is then preferred that the directed path of the pre-determined "volume-up"-gesture lacks a vector component in the direction from the user to the additional controls.

The invention as described above relates to a system as an entity that can be commercially exploited. The invention may also be commercially exploited as control software to be run on a data processing system such as, e.g., a server, a personal computer, a mobile telephone, etc. The control software may be provided as stored in a computer-readable medium such as a solid-state memory, a magnetic disc, an optical disk, etc. The control software may also be made commercially available as a file download via a data network such as the Internet.

Therefore, the invention also relates to control software on a computer-readable medium configured for use on a system with a contactless user-interface. The contactless user-interface is configured for a user's controlling a functionality of the system through contactless interaction with the contactless user-interface. The contactless user-interface has a detector sub-system and a user-feedback sub-system. The control software has first instructions for implementing operation of the contactless user-interface in an alert mode, and second instructions for implementing operation of the contactless user-interface in a control mode. The first instructions comprise third instructions for controlling the user-feedback sub-system to provide an acknowledgement to the user, in response to the detector sub-system having detected a presence of the user within a pre-determined alert range. The first instructions comprise fourth instructions for causing the contactless user-interface to transition from the alert mode to the control mode in response to the detector sub-system detecting a pre-determined initialization gesture made by the user within the pre-determined alert range. The second instructions comprise fifth instructions for controlling the functionality in response to the detector subsystem detecting a pre-determined control gesture of the user carried out within the pre-determined alert range.

In an embodiment of the control software, the second instructions comprise sixth instructions for controlling the user-feedback sub-system to provide to the user control feedback on a change in a status of the functionality in response to the pre-determined control gesture.

In a further embodiment of the control software, the first instructions comprise seventh instructions for control of the user-feedback sub-system for dynamically adjusting the acknowledgement under control of the detector sub-system tracking the user within the alert range.

In a further embodiment of the control software, the second instructions comprise ninth instructions for controlling the user-feedback sub-system to dynamically adjust the control feedback under control of the detector sub-system tracking the user within the alert range.

In a further embodiment of the control software, the system has an additional user-interface. The additional user-interface is configured for the user's controlling an additional functionality of the system through physical contact with the additional user-interface. The second instructions comprise tenth instructions for inactivating the user controlling the functionality via the contactless user-interface upon the detector sub-system detecting the user approaching the additional user-interface in a pre-determined manner.

The invention may also be commercially exploited as a service or method. The invention therefore also relates to a method of enabling a user to control a functionality of a system through contactless interaction with the system. The method has an alert mode process and a control mode process. The method comprises, in the alert mode process, providing an acknowledgement to the user, in response to detecting a presence of the user within a pre-determined alert range. The method further comprises: transitioning from the alert mode process to the control mode process in response to detecting a pre-determined initialization gesture made by the user within the pre-determined alert range. The method also comprises: in the control mode process, controlling the functionality in response to detecting a pre-determined control gesture of the user carried out within the pre-determined alert range.

In an embodiment of the method, the control mode process comprises providing to the user control feedback on a change in a status of the functionality in response to the pre-determined control gesture.

In a further embodiment of the method, the alert mode process comprises dynamically adjusting the acknowledgement under control of tracking the user within the alert range.

In a further embodiment of the method, the control mode process comprises dynamically adjusting the control feedback under control of tracking the user within the alert range.

In a further embodiment of the method, the system has an additional user-interface. The additional user-interface is configured for the user's controlling an additional functionality of the system through physical contact with the additional user-interface. The method comprises inactivating the controlling of the functionality through the contactless interaction upon detecting the user approaching the additional user-interface in a pre-determined manner.

The invention may also be commercially exploited as a component for a system with a controllable functionality. The invention therefore also relates to a user-interface for use in a system, the user-interface comprising a contactless user-interface configured for a user's controlling a functionality of the system through contactless interaction with the contactless user-interface. The contactless user-interface has a detector sub-system and a user-feedback sub-system. The contactless user-interface is configured for operating in one of: an alert mode and a control mode. In the alert mode, the contactless user-interface is configured for controlling the user-feedback sub-system to provide an acknowledgement to the user, in response to the detector sub-system having detected a presence of the user within a pre-determined alert range. The contactless user-interface is configured for transitioning from the alert mode to the control mode in response to the detector sub-system detecting a pre-determined initialization gesture made by the user within the pre-determined alert range. In the control mode, the contactless user-interface is configured for controlling the functionality in response to the detector subsystem detecting a pre-determined control gesture of the user carried out within the pre-determined alert range.

In an embodiment of the user-interface, the user-feedback sub-system is configured to provide to the user control feedback on a change in a status of the functionality in response to the pre-determined control gesture.

In a further embodiment of the user-interface, the user-feedback sub-system is configured for dynamically adjusting the acknowledgement under control of the detector sub-system tracking the user within the alert range.

In a further embodiment of the user-interface, the user-feedback sub-system is configured for dynamically adjusting the control feedback under control of the detector sub-system tracking the user within the alert range.

In a further embodiment of the user-interface, the user-interface has an additional user-interface. The additional user-interface is configured for the user's controlling an additional functionality of the system through physical contact with the additional user-interface. The detector sub-system is operative to inactivate the user controlling the functionality via the contactless user-interface upon detecting the user approaching the additional user-interface in a pre-determined manner.

BRIEF DESCRIPTION OF THE DRAWING

The invention is explained in further detail, by way of example and with reference to the accompanying drawing, wherein.

Throughout the Figures, similar or corresponding features are indicated by same reference numerals.

DETAILED EMBODIMENTS

Figure 1:
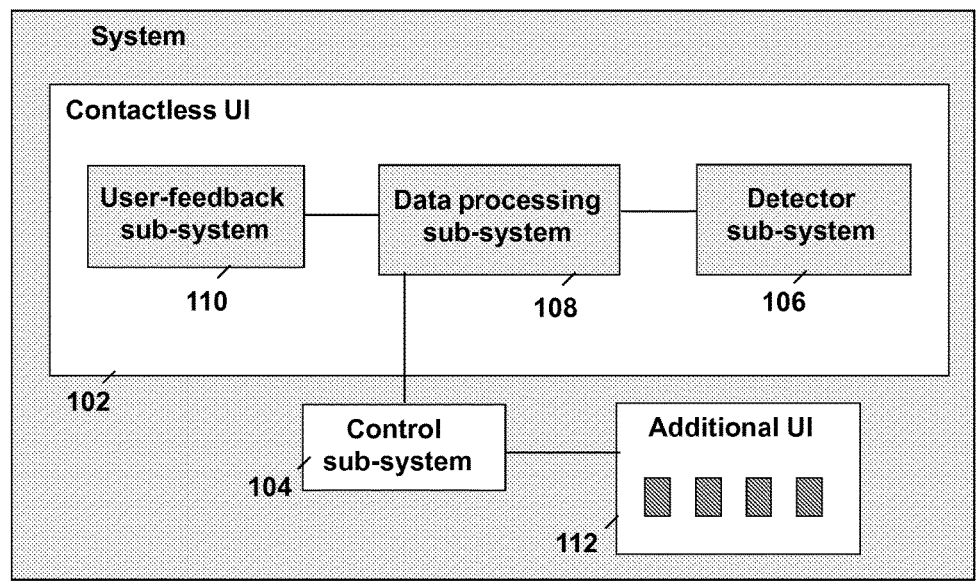
FIG. 1 is a block diagram of a system in the invention.

FIG. 1 is a diagram of a system 100 in the invention. Examples of such a system 100 are: a consumer electronics system such as a home entertainment system, an alarm clock, a TV receiver, a personal computer, etc.; a handheld device such as a mobile telephone or a remote control device; an appliance, such as a microwave oven, a kitchen stove or a laundry machine, etc. a vending machine for beverages, candy or other food items; a ticket machine; etc.

The system 100 has a functionality that can be controlled by a user to adjust the functionality, select the functionality for activating or deactivating, etc. Examples of such functionality have been discussed above.

The system 100 has a contactless user-interface 102 and a control sub-system 104.

The contactless user-interface 102 enables the user of the system 100 to interact with the system 100 in order to configure the system 100 for operational use by means of, e.g., adjusting or selecting the functionality of the system 100. The user interacts with the contactless user-interface 102 through gestures. The gestures of the user are captured by the contactless user-interface 102 and form the user input to the system 100. The contactless user-interface 102 processes the input to generate a control output that is supplied to the control sub-system 104. The control sub-system 104 receives the control output from the contactless user-interface 102 and controls the functionality accordingly.

The contactless user-interface 102 comprises a detector sub-system 106, a data processing sub-system 108, and a user-feedback sub-system 110.

The detector sub-system 106 is configured for detecting of a presence of the user, or a body part of the user such as his/her hand or his/her head, within an alert range of the detector. The detector sub-system 106 is also configured for tracking the user or his/her hand or head, etc., when present within the alert range of the detector.

Detection of the proximity of the user may be implemented by using any of a variety of techniques to detect the proximity of the user or of another object within the alert range, or by using a combination of these techniques. For example, a first known proximity detection technology is based on sensing body heat received via an infrared sensor. As another example, a second known proximity detection technology is based on the detector transmitting pulses of ultrasonic waves and measuring the reflection off the user or off another object within the alert range. As yet another example, a third known proximity detection technology is based on the user or the object interrupting one or more light beams or laser beams. As still another example, a fourth proximity detection technology is based on sensing a change in capacitance caused by the capacitive coupling between the detector and the nearby user or the nearby object. As yet another example, a fifth proximity detection technology is based on analysis of images captured by a video camera that surveys a pre-determined space.

Detection of the movements of the user, or of a body part of the user, within the alert range may be implemented by using any of a variety of techniques to detect the movements of the user or of another object within the alert range, or a combination of these motion detection techniques. The movement may be a change of position of the user, or of the object as a whole, relative to the detector sub-system 106, and/or change of orientation of the user or of the object relative to the detector sub-system. Motion detection is based, for example, on analyzing the rate of change of the proximity as detected with any of aforesaid proximity detection techniques. The rate of change of the proximity as detected may indicate a movement away from, or towards the detector sub-system 106, and/or a movement from left to right relative to the detector sub-system 106 or vice versa, and/or an upwards or downward movement relative to the detector sub-system 106, etc.

Proximity detectors and motion detectors are well known in the art. Therefore, the implementing technologies to make or use such detectors will not be discussed here in further detail.

The detector sub-system 106 generates a detector output that is representative of the user's movements as captured within the alert-range. The detector sub-system 106 supplies the detector output to the data processing sub-system 108. The data processing sub-system 108 processes the detector output as received and supplies a feedback output to the user-feedback sub-system 110 and supplies the control output to the control sub-system 104, as mentioned above.

The user-feedback sub-system 110 receives the feedback output from the data processing sub-system 108. The feedback output received is representative of the of the user's movements as captured by the detector sub-system 106. The user-feedback sub-system 110 serves to provide feedback to the user indicative of the feedback output and, therefore, of the user-interaction with the contactless user-interface 102 as captured by the detector sub-system 106. The feedback to the user typically comprises a visual feedback and/or an audible feedback.

The control sub-system 104 receives the control output from the contactless user-interface 102. The control output is indicative of the user-interaction with the contactless user-interface 102. The control sub-system 104 controls the functionality in accordance with the control output received.

The contactless user-interface 102 has an alert mode and a control mode. In the alert mode, the user-feedback sub-system provides an acknowledgement to the user if the detector sub-system 106 has detected the presence of the user within the pre-determined alert range. In the alert mode, the gestures of the user, as captured by the detector sub-system 106, do not result in the control-sub-system 104 receiving a control output. Accordingly, the functionality of the system 100 cannot be controlled by the user making gestures within the alert range.

If the detector sub-system 106 detects a pre-determined initializing gesture of the user carried out within the alert range and while the contactless user-interface 102 is in the alert mode, the contactless user-interface 102 transitions from the alert mode to the control mode. In the control mode, the contactless user-interface 102 controls the functionality via the control sub-system 104, in response to the detector subsystem 106 detecting a pre-determined control gesture of the user carried out within the pre-determined alert range.

The system 100 also has an additional user-interface 112. The additional user-interface 112 enables the user to control an additional functionality of the system 100 through physical contact with the additional user-interface 112. For example, the additional user-interface 112 has one or more physical buttons, physical sliders, or dials, or the additional user-interface 112 comprises a touch screen. The additional functionality and the functionality first-mentioned may, but need not, be the same functionality. The detector sub-system 106 inactivates or overrides the control mode of the contactless user-interface 102 upon detecting that the user approaches the additional user-interface 112 in a pre-determined manner. As explained earlier, overriding the control mode in these circumstances prevents the functionality from being controlled inadvertently, in response to the contactless user-interface 102 interpreting the user's reaching at the additional user-interface 112 as a pre-determined control gesture.

Figure 2:
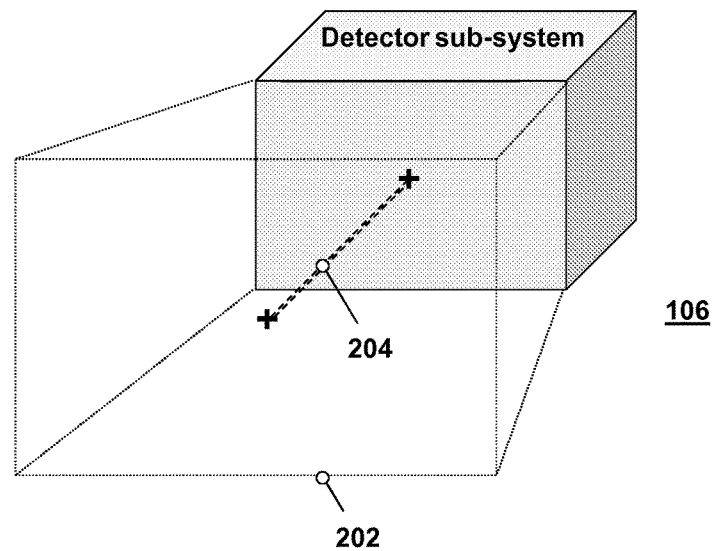
FIGS. 2, 3 and 4 are diagrams illustrating operation of the detector sub-system in the system of the invention.
Figure 3:
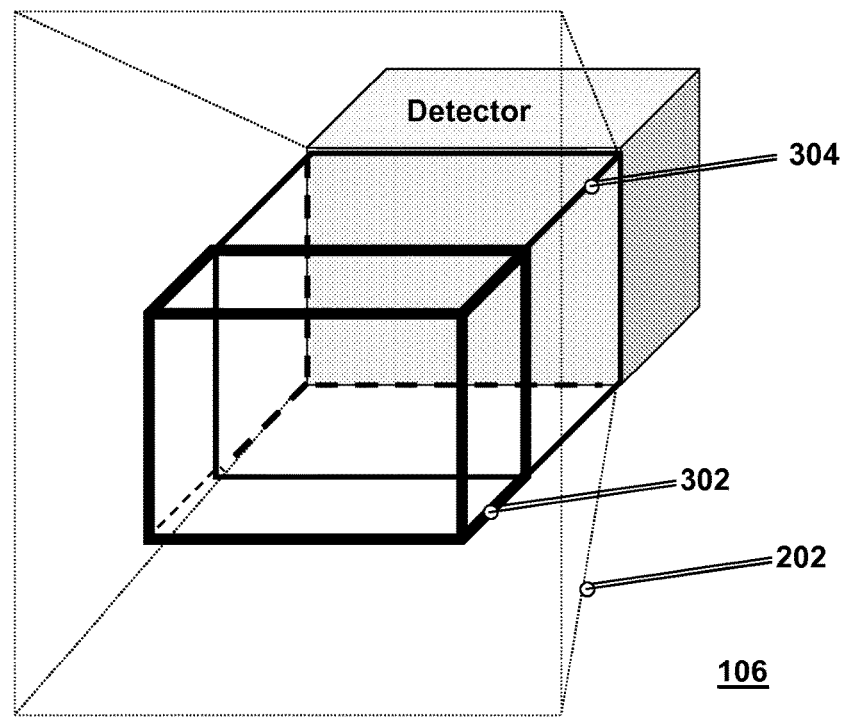
Figure 4:
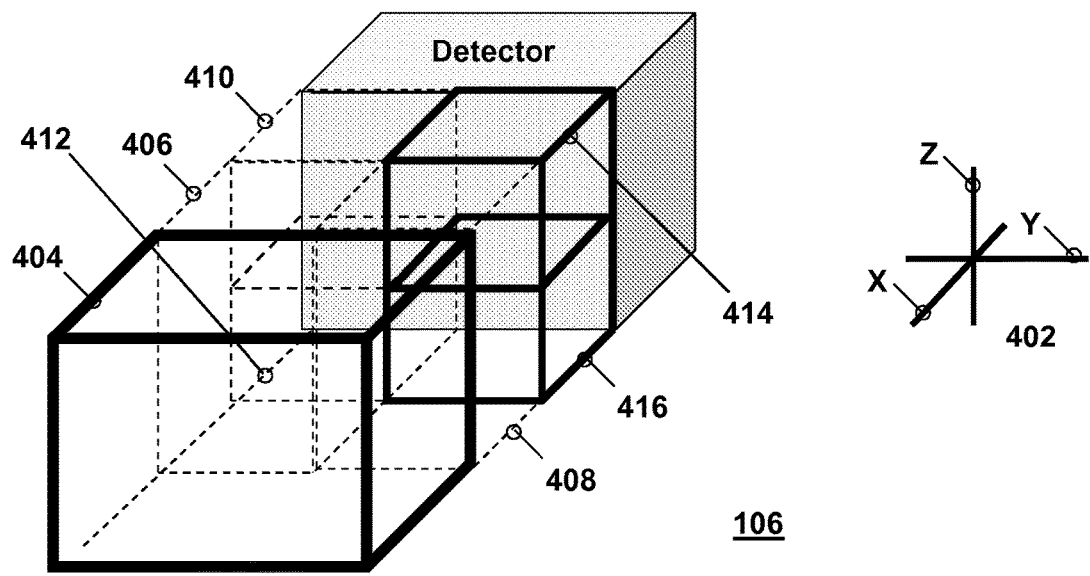

FIGS. 2, 3 and 4 are diagrams illustrating operation of the detector sub-system 106 in the system 100.

The diagram of FIG. 2 shows a first embodiment of the detector sub-system 106 that is positioned in an environment of the user and that faces the user. The first embodiment of the detector sub-system 106 responds to the movements of the user only if the user enters, or is present within, a part 202 of the environment. This part has been referred to in this text as the "alert range". The contactless user-interface 102 provides an acknowledgement to the user when he/she is present, entirely or only partly, within the alert range 202, so as to notify the user of his/her being noticed. If the user then carries out the pre-determined initialization gesture within the alert range 202, the contactless user-interface 102 transitions from the alert mode to the control mode. In the control mode, the contactless user-interface 102 responds to pre-determined control gestures of the user, if carried out within the alert range, by means of adjusting or otherwise controlling the functionality of the system 100. The alert range 202 is only drawn schematically. The actual spatial shape and the dimensions of the alert range 202 depend on, among other things, the techniques uses to implement the detector sub-system 106. The diagram of FIG. 2 illustrates the alert range 202 as being centered on an axis 204 projecting from the detector sub-system 106, roughly in the direction of the user when facing the detector sub-system 106 in operational use.

The diagram of FIG. 2 shows a second embodiment of the detector sub-system 106. In the second embodiment, the alert range 202 has a far control sector 302 and a near control sector 304. The adjectives "far" and "near" qualify the distance as measured from the detector sub-system 106. The near control sector 304 lies between the far control sector 302 and the detector sub-system 106. Assume that the contactless user-interface 102 is in the control mode. If the user makes a first pre-determined control gesture within the far control sector 302, the contactless user-interface 102 responds by controlling a first functionality of the system 100 in accordance with the first pre-determined control gesture as captured by the detector sub-system 106. If the user makes a second pre-determined control gesture, different from the first pre-determined control gesture, within the far control sector 302, the contactless user-interface 102 does not respond. If the user makes the second pre-determined control gesture within the near control sector 304, the contactless user-interface 102 responds by controlling a second functionality of the system 100 in accordance with the second pre-determined control gesture as captured by the detector sub-system 106.

More generally, the contactless user-interface 102 is configured to respond differently to different pre-determined control gestures carried out within different control sectors, e.g., the first control sector 302 and the second control sector 304, within the alert range 202. Alternatively, the contactless user-interface 102 is configured to respond differently to the same pre-determined control gesture carried out in different control sectors within the alert range 202. The diagram of FIG. 4 illustrates this more general configuration.

In the diagram of FIG. 4, the alert range 202 (not shown separately here) comprises a plurality of control sectors between the user and the detector sub-system 106. The plurality of the control sectors have a spatial arrangement explained as follows with reference to a Cartesian coordinate system 402. The Cartesian coordinate system 402 has an X-axis, a Y-axis and a Z-axis. The detector sub-system 106 faces a direction parallel to the positive X-axis.

If the user approaches the detector sub-system 106 along the X-axis, the user first enters a first control sector 404. A projection of the first control sector 402 along the X-axis onto the detector sub-system 106 overlaps the detector sub-system 106 completely. That is, the detector sub-system 106 does not discriminate between a first pre-determined control gesture carried out in the upper half of the first control sector 404 (Z is positive), the same first pre-determined control gesture carried out in the lower half of the first control sector 404 (Z is negative), the same first pre-determined control gesture carried out in the left half of the first control sector 404 (Y is negative) and the same first pre-determined control gesture carried out in the right half of the first control sector 404 (Y is positive).

If the user continues to approach the detector sub-system 106 along the X-axis, the user exits the first control sector 404 and enters either a second control sector 406 (Y is negative) or a third control sector 408 (Y is positive). A projection of the second control sector 406 along the X-axis onto the detector sub-system 106 only overlaps a left-hand side of the detector sub-system 106. A projection of the third control sector 408 along the X-axis onto the detector sub-system 106 only overlaps a right-hand side of the detector sub-system 106. That is, a pre-determined control gesture carried out in the second control sector 406 leads to a response of the contactless user-interface 102 that is different from the response to the same pre-determined control gesture when carried out in the third control sector 408, and vice versa.

If the user continues to approach the detector sub-system 106 along the X-axis, the user exits either the second control sector 406 or the third control sector 408.

If the user exits the second control sector 406, the user enters either a fourth control sector 410 or a fifth control sector 412. The fourth control sector 410 is characterized by Z being positive and Y being negative. The fifth control sector 412 is characterized by Z being negative and Y being negative.

If the user exits the third control sector 408, the user enters either a sixth control sector 414 or a seventh control sector 416. The sixth control sector 414 is characterized by Z being positive and Y being positive. The seventh control sector 416 is characterized by Z being negative and Y being positive.

Accordingly, a pre-determined control gesture carried out in a specific one of the fourth control sector 410, the fifth control sector 412, the sixth control sector 414 and the seventh 416 leads to a response of the contactless user-interface 102 that is different from the response to the same pre-determined control gesture when carried out in another one of the fourth control sector 410, the fifth control sector 412, the sixth control sector 414 and the seventh 416.

The closer the user gets to the detector sub-system 106, the more accurate will be the capturing of the path of the pre-determined control gestures by the detector sub-system 106 and the better will be the discriminating between two or more different pathos of the pre-determined control gestures. Therefore, the control sectors closer to the detector sub-system 106 can be made smaller than the control sectors farther away from the detector sub-system 106.

Figure 5:
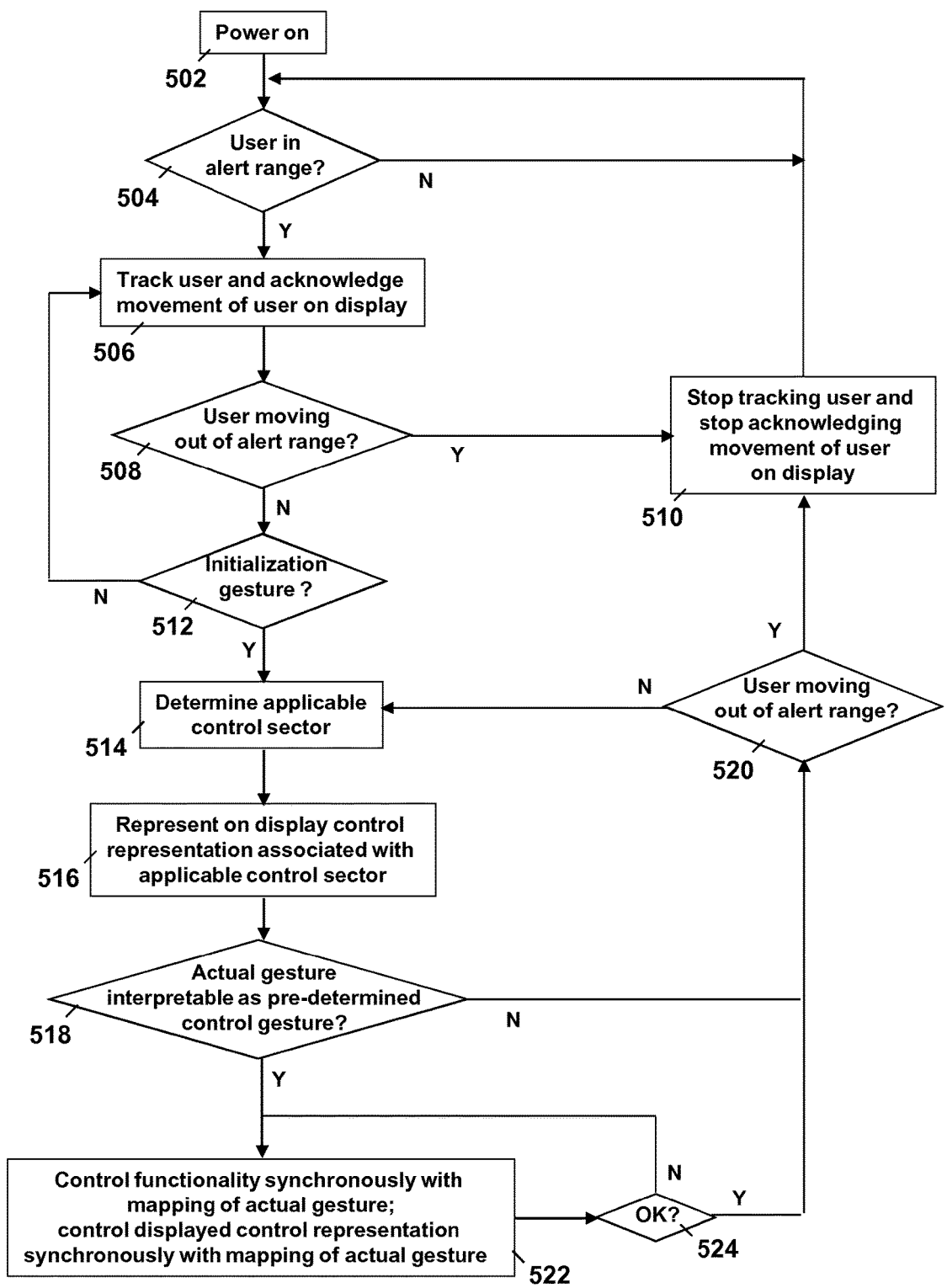
FIG. 5 is a process diagram illustrating a method of the invention.

FIG. 5 is a diagram of a process 500 illustrating a method of the invention. It is assumed here that the user-feedback sub-system 110 has a display monitor (not shown in FIG. 1). The user-feedback sub-system 110 provides the acknowledgment in a graphics format via the display monitor upon the user entering the alert range 202. The user-feedback sub-system 110 also provides to the user control feedback on a change in a status of the functionality in response to the pre-determined control gesture.

In a first step 502, the power of the system 100 is turned on. The contactless user-interface 102 is then ready for operational use.

In a second step 504, the detector sub-system 106 checks whether the user is within the alert range 202. If the user is not within the alert range 202, the detector sub-system 106 continues to check whether the user has entered the alert range 202. If the user has entered the alert range 202, the process continues with a third step 506.

In the third step 506, the user-feedback sub-system 110 controls the display monitor to show an acknowledgement in the form of a graphics object so as to notify the user that he/she has been detected within the alert range 202. The detector sub-system 106 keeps tracking the movements of the user. The user-feedback sub-system 110 dynamically controls the graphics object on the display monitor in dependence on the movements of the user within the alert range 202.

In a fourth step 508, the contactless user-interface 102 checks whether the user moves out of the alert range 202. If it is determined in the fourth step 508 that the user has moved out of the alert range 202, the process 500 proceeds to a fifth step 510.

In the fifth step 510, the contactless user-interface 102 terminates the tracking of the user and the displaying of the graphics object on the display monitor. After the fifth step 510, the process 500 returns to the second step 504.

The alert range 202 is a spatial environment of the detector sub-system 106, wherein the presence and gestures of the user affects the operation of the contactless user-interface 102. In the alert mode, an acknowledgement is given to the user via the user-feedback sub-system 110. In the control mode, the relevant functionality is controlled in response to pre-determined control gestures, and the user-feedback sub-system provides feedback to the user on the gestures captured. The alert range 202 may start right at the physical boundaries of the detector sub-system 106 and extends away from the detector sub-system 106. A physical boundary of the detector sub-system 106 includes, e.g., the physical surface of a hardware component such as a motion sensor or a position sensor accommodated at the detector sub-system 106. Alternatively, a dead-zone may be implemented intentionally between the alert zone 202 and the physical boundaries of the detector sub-system 106, in case the system 100 includes the additional user-interface 112. If the detector sub-system 106 detects the presence of the user, or of a body part of the user (e.g., the user's hand), in the dead-zone, this presence is interpreted as that the user intends to interact with the additional user-interface 112. The contactless user-interface 102 will then interpret the presence of the user, or of a body part of the user, within the dead-zone as that the user has left the alert range 202. The process 500 will then terminate the tracking of the user and the displaying of the graphics object on the display monitor according to the fifth step 510.

If it is determined in the fourth step 508 that the user has not moved out of the alert range 202, the process 500 proceeds to a sixth step 512.

In the sixth step 512, it is determined whether the user has carried out the pre-determined initialization gesture. If it is determined in the sixth step 512 that the user has not carried out the pre-determined initialization gesture, the process 500 returns to the third step 506. If it is determined in the sixth step 512 that the user has carried out the pre-determined initialization gesture, the process 500 continues with a seventh step 514.

In the seventh step 514, the detector sub-system 106 determines the applicable one of multiple control sectors in the alert range. Examples of an alert range with multiple control sectors are given in the diagrams of FIGS. 3 and 4, discussed above. If there is only a single control sector in the alert range 202, the seventh step 514 is absent from the process 500. After the seventh step 514, the process continues to an eighth step 516.

In the eighth step 516, the user-feedback sub-system 110 controls the display monitor to show a control representation, i.e., a representation of the controllability of the functionality associated with the applicable control sector. For example, if the functionality comprises the adjustment of the volume of a sound, or the brightness of a lamp, the control representation comprises a linear scale indicative of a range of magnitudes that the volume or the brightness can assume. The current magnitude of the volume or of the brightness is graphically indicated on the linear scale. The associated pre-determined control gesture is then operative to adjust the volume or the brightness as well as to adjust the current magnitude indicated graphically on the linear scale. As another example, the functionality comprises the selection of a specific one of a plurality of items of information content. The items may be represented in a playlist or in an electronic program guide (EPG). The control representation comprises the playlist or the EPG, or a part thereof, with a highlight indicating the item currently selection. The associated pre-determined control gesture is then operative to select a new item as well as to adjust the position of the highlight in the control representation so as to correspond with the item newly selected. After the eighth step 516, the process continues with a ninth step 518.

In the ninth step 518, the contactless user-interface 102 determines whether or not the user's movements are interpreted as a pre-determined control gesture applicable to the current control sector determined in the seventh step 514. If it is determined in the ninth step 518 that the user's movements cannot be interpreted as an applicable pre-determined control gesture, the process 500 proceeds with a tenth step 520.

In the tenth step 520, it is determined whether or not the user has moved out of the alert range 202. If it is determined in the tenth step 520 that the user has moved out of the alert range 202, the process 500 returns to the fifth step 510. If it is determined in the tenth step 520 that the user has not left the alert range 202, the process 500 returns to the seventh step 514.

If it is determined in the ninth step 518 that the user's movements are interpreted as an applicable pre-determined control gesture, the process 500 proceeds with an eleventh step 522.

In the eleventh step 522, the functionality is controlled in accordance with the temporal and spatial characteristics of the user's movements. The actual movement as captured by the detector sub-system 106 is mapped onto an applicable pre-determined control gesture. As mentioned earlier, a gesture is a deliberate movement of a position of, e.g., the user's hand. The actual movement of the user's hand is characterized by changing a position of the hand relative to some reference position, changing an orientation of the hand relative to a reference orientation, and changing a shape of the hand relative to a reference shape. In practice, an actual movement cannot be repeated with an accuracy of, say a few millimeters in each of the dimensions characterizing the movement. The actual gesture as captured by the detector sub-system 106 is therefore to be compared to one or more pre-determined control gestures applicable to the applicable control sector. If a comparison with a specific applicable, pre-determined control gesture reveals a discrepancy of a magnitude within a pre-determined margin, the actual gesture is treated as equivalent to the specific, applicable pre-determined control gesture.

Remember that in the eighth step 516, the user-feedback sub-system 110 generated a control representation on the display monitor in the form of a graphics object. In the eleventh step 522, the user-feedback sub-system 110 controls the displayed control representation also in accordance with the temporal and spatial characteristics of the user's movements, thus providing a visual feedback to the user of the effect of the user's gestures on the functionality being currently controlled.

The control of the functionality and the control of the displayed control representation continue until it is determined in a twelfth step 524 that the adjustment or control of the functionality can be terminated. Termination is affirmed if, for example, the user retreats from the applicable control sector or if the user retrieves his/her hand from the applicable control sector. Alternatively, the user may terminate the current control by means of a pre-determined halt-gesture that is interpreted by the contactless user-interface 102 as that the control is to be halted. If it is determined in the twelfth step 524 that the user has stopped the control, the process returns to the tenth step 520.

FIGS. 6, 7, 8 and 9 illustrate an example of a graphics representation of the acknowledgement from the user-feedback sub-system 110 in the alert mode of the contactless user-interface 102. The user-feedback sub-system 110 comprises a display monitor 602. Consider the operational use of the system 100, i.e., an operational state of the system, wherein the power is on and wherein the user is beyond the alert range 202. In this operational state, the display monitor 602 is controlled to display content information to the user, i.e., information that is semantically meaningful to the user if he/she watches the display monitor 602. In the example of FIGS. 6-9, the content information is in the form of a graphics object 604 representing an analog clock. The hands of the clock in the graphics object 604 are controlled to indicate the current time of the day.

Figure 6:
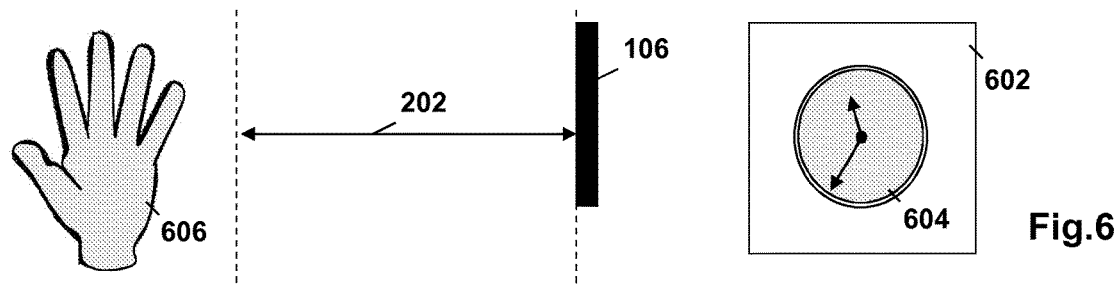
FIGS. 6, 7, 8 and 9 illustrate a graphics representation of the acknowledgement from the user-feedback sub-system.

In FIG. 6, the user is represented by a hand 606. The hand 606 is outside the alert range 202 of the detector sub-system 106. The display monitor 602 is displaying the analog clock 604.

Figure 7:
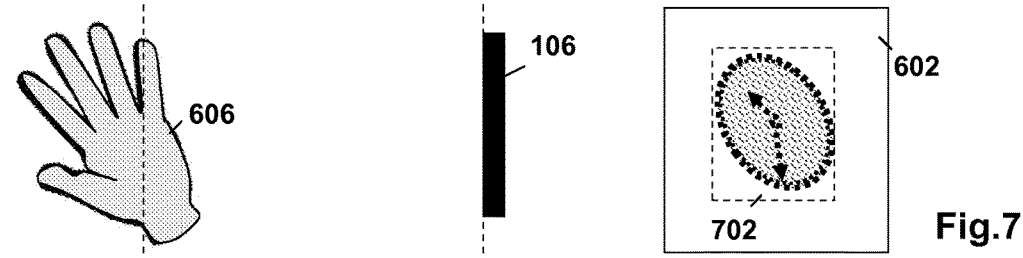

In FIG. 7, the hand 606 is entering the alert range 202. The detector sub-system 106 detects the hand 606 and the contactless user-interface 102 enters the alert mode. In the alert mode, the user-feedback sub-system 110 controls the display monitor 602 to morph the graphics object of the analog clock 604 into a collection of particles 702 upon detection of the hand 606.

In considering the collection of particles 702: as known in the field of computer-generated graphics, particle animation is typically applied to create a rather complex graphics structure from relatively simple, abstract descriptions. The rather complex graphics structure can be made to change dynamically in a perceptibly convincing manner using modest compute power. For more background see, e.g., "Particle Animation and rendering Using Data Parallel Computing", Karl Sims, Computer Graphics, Vol. 24(4), August 1990, pp. 405-413; or "Modeling Surfaces of Arbitrary Topology with Dynamic Particles", Richard Szeliski et al., 1993 IEEE Computer Society Conference on Computer Vision and Pattern Recognition, Proceedings CVPR '93, pp. 82-87.

Particle animation is used in the examples of FIGS. 6-9 to create a graphics object that represents the user's hand 606 on the display monitor 602. The graphics object is here the collection of particles 702. The particles are individually controlled to dynamically change their positions, so as to mirror the actual movements of the hand 606 as captured by the detection sub-system 106. As discussed above, the mirroring of the user's movements by the graphics object contributes to the user-friendliness of the system 100. Implementing this graphics object by means of particle animation has an advantage that the shape and movements of any real-life object, as captured by the detector sub-system 106 within the alert range 202, can be mimicked in a convincing manner, be it the user's hand, the user's leg, or the beard of Santa Claus if he were to intend to control the system pogonally (i.e., by means of his beard) via the contactless user-interface 102.

Figure 8:
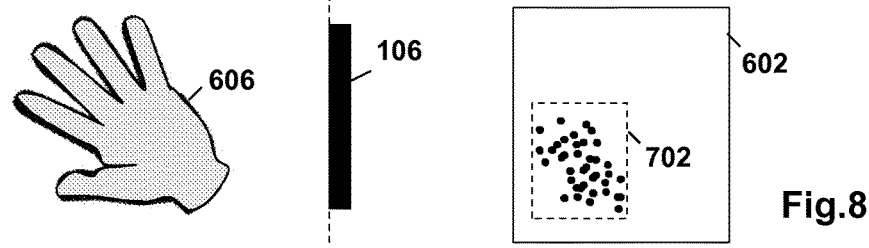

In FIG. 8, the hand 604 has entered the alert range 202 and the detection sub-system 106 is tracking the movements of the hand 606. The user-feedback sub-system 110 controls the display monitor 602 so as to have the collection of particles 702 mirror the movements of the hand 606.

Figure 9:
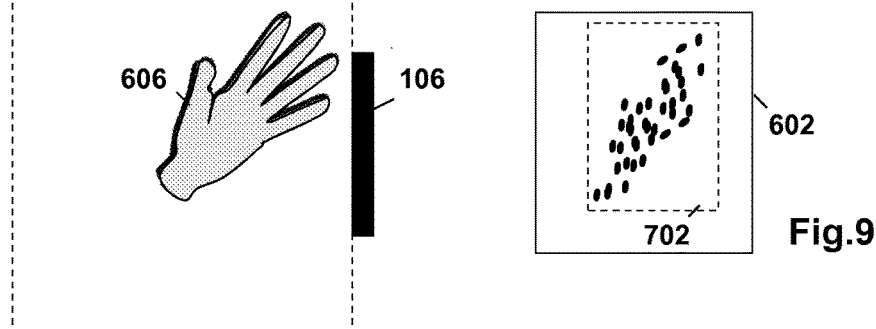

In FIG. 9, the hand 604 has come closer to the detector sub-system 106, and the collection of particles 702 is occupying a larger part of the screen real estate of the display monitor 602 than in FIG. 8, and is mirroring the current movements of the hand 604.

If the user removes his/her hand 606 from the alert range 202 upon reaching any of the states illustrated in the diagrams of FIGS. 7, 8 and 9, the user-feedback subsystem 110 morphs the collection of particles 702 back again into the analog clock 604 in the diagram of FIG. 6.

Figure 10:
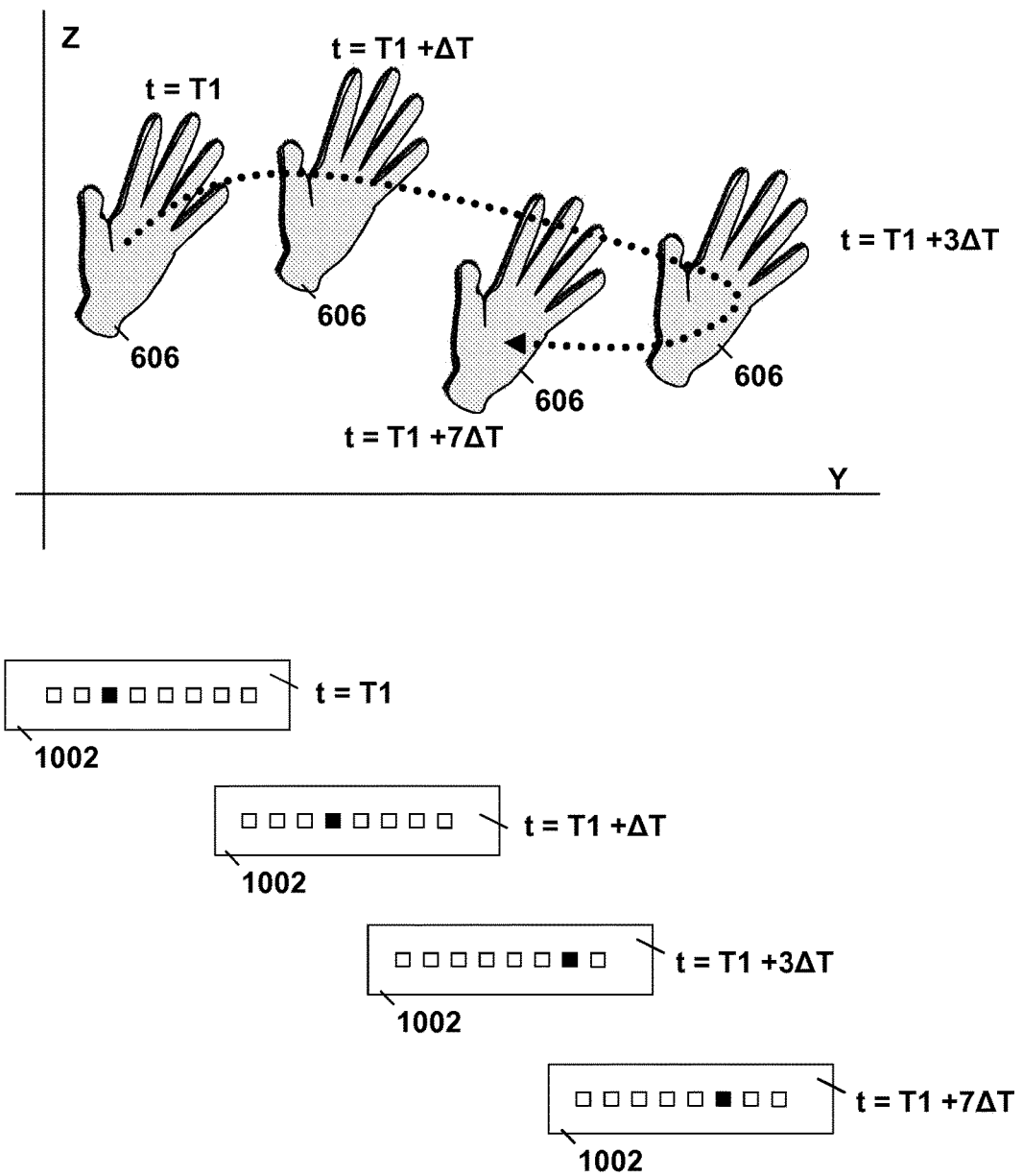
FIGS. 10 and 11 illustrate a graphics representation of the control feedback from the user-feedback sub-system.
Figure 11:
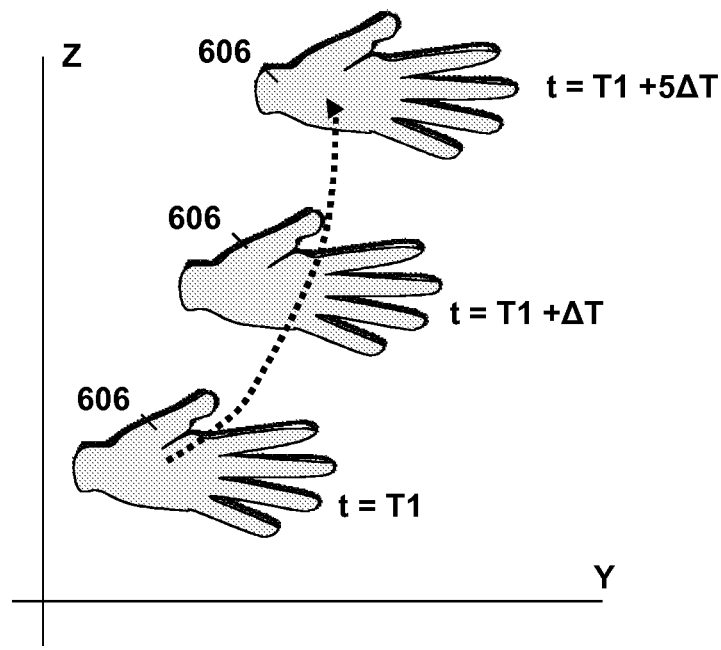
Figure 11:
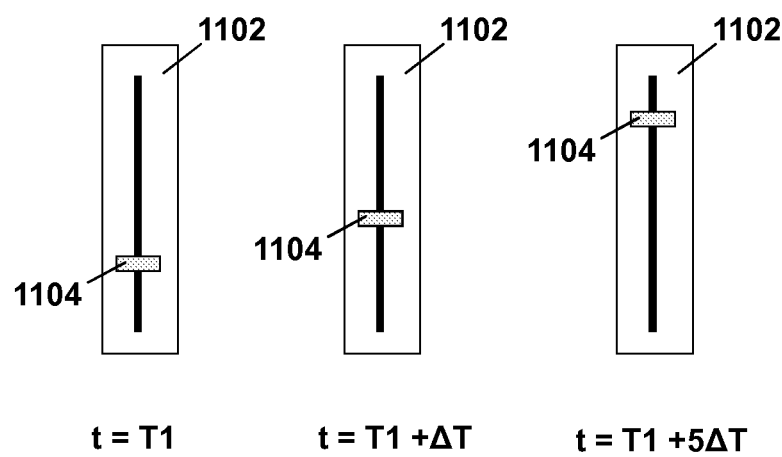

FIGS. 10 and 11 are diagrams illustrating the operation of the user-feedback sub-system 110 when the contactless user-interface 102 is in the control mode. The user-feedback sub-system 110 is operative to provide control feedback to the user.

It is assumed that the user's hand 606 has entered a control sector wherein a first functionality of the system 100 is controlled by a first pre-determined control gesture and wherein a second functionality of the system 100 is controlled by a second pre-determined control gesture. The contactless user-interface 102 interprets an actual movement of the hand 606 as being the first pre-determined control gesture, if the actual movement has a main vector component substantially along the Y-axis of the Cartesian coordinate system 402 of FIG. 4. The contactless user-interface 102 interprets an actual movement of the hand 606 as being the second pre-determined control gesture, if the actual movement has a main vector component along the Z-axis of the Cartesian coordinate system 402 of FIG. 4.

As illustrated in the diagram of FIG. 10, the control representation of the first functionality is a first graphics object 1002 that comprises a horizontal array of a plurality of boxes. Each respective one of the boxes represents a respective magnitude, level or state to which the first functionality can set in the control mode of the contactless user-interface 102. Assume that the hand 606 has entered the relevant control sector at a time t=T1. Up to the time t=T1 the first functionality has had the state that corresponds to the third box of the array. The third box of the horizontal array is highlighted. While his/her hand 606 is in the relevant control sector, the user starts to move his/her hand 606 in the direction of the positive Y-axis. The detector sub-system 106 tracks the movement. The detector output causes, via the control sub-system 104, the state of the first functionality to change in accordance with the movement of the hand 606 in the positive direction along the Y-axis. The detector output also causes the user-feedback sub-system 110 to change the first graphics object 1002 in accordance with the movement of the hand 606 being tracked. At a time t=T1+ΔT, the highlight has left the third box and the fourth box of the horizontal array is highlighted. At a time t=T1+3ΔT, the highlight has left the fourth box and the seventh box of the horizontal array is highlighted. Apparently, the user has realized that he/she has overshot the intended final state, and the user moves his/her hand 606 back in the negative direction along the Y-axis. At a time t=T1+7 ΔT, the highlight has left the seventh box and the sixth box of the horizontal array is highlighted.

As illustrated in the diagram of FIG. 11, the control representation of the second functionality is a second graphics object 1102 that comprises a vertical slider 1104. Each respective vertical position of the slider 1104 corresponds to a respective level to which the second functionality can be set in the control mode of the contactless user-interface 102. Assume that the hand 606 has entered the relevant control sector at a time t=T1. Up to the time t=T1 the second functionality has had the level that corresponds with the position of the slider 1104 as indicated at t=T1. While his/her hand 606 is in the relevant control sector, the user starts to move his/her hand 606 in the direction of the positive Z-axis. The detector sub-system 106 tracks the movement. The detector output causes, via the control sub-system 104, the state of the second functionality to change in accordance with the movement of the hand 606 in the positive direction along the Z-axis. The detector output also causes the user-feedback sub-system 110 to change the second graphics object 1102 in accordance with the movement of the hand 606 being tracked. At a time t=T1+ΔT, the slider 1104 has moved to a higher vertical level. The higher level at the time t=T1+ΔT corresponds with the vertical position that the hand 606 assumes at the time t=T1+ΔT. At a time t=T1+5ΔT, the slider 1104 has moved to a yet higher vertical level. The yet higher level at the time t=T1+5ΔT corresponds with the vertical position that the hand 606 assumes at the time t=T1+5ΔT.

The transition from the alert mode of the contactless user-interface 102 to the control mode goes together with the transitioning of displaying the acknowledgment (in above example: the collection of particles 702) that mirrors the user's movements, to displaying the control feedback (in above example: the first graphics object 1002 or the second graphics object 1102) that mirrors the user's gestures. The transitioning between displaying the acknowledgment and displaying the control feedback, and vice versa, can be implemented again using a cross-fading technique or a morphing technique.

Note that the first graphics object 1002 and the second graphics object 1102 can be displayed on the display monitor 602 at the same time. The contactless user-interface 102 discriminates between actual gestures of the user, in this example based on their main vector component, so that either the first functionality or the second functionality is controlled if both their graphics representations (i.e., the first graphics object 1002 and the second graphics object 1102) are being displayed at the same time. This prevents an actual gesture, meant by the user to control the state of the first functionality, from affecting the state of the second functionality and vice versa.

The invention claimed is:

1. A system with a contactless user-interface configured for a user's controlling a functionality of the system through contactless interaction with the contactless user-interface, wherein:

the contactless user-interface including a detector sub-system, a data processing sub-system, a user-feedback sub-system and a control sub-system, wherein the user-feedback system includes a display monitor for providing visual operational related information to the user about the functioning of the system in operational use;

the contactless user-interface is configured for operating in one of: an alert mode and a control mode;

in the alert mode, the contactless user-interface is configured to:

respond to the detector sub-system detecting a predetermined initialization gesture of the user within the predetermined alert range, provide an acknowledgement of detection to the user of having detected the presence of the user in the user-feedback sub-system via said display monitor, in response to the detector sub-system having detected a presence of the user within a pre-determined alert range, wherein said user acknowledgment comprises replacing the operational related information being displayed on the display monitor by a dedicated graphical indication to acknowledge to the user that the user's presence has been detected; and transition from the alert mode to the control mode;

in the control mode, the contactless user-interface is configured to:

control a primary functionality of the system in response to the detector subsystem detecting a pre-determined control gesture of the user carried out within the pre-determined alert range, wherein the user-feedback sub-system is configured to provide to the user control feedback on a change in a status of the functionality in response to the pre-determined control gesture, the system further comprising an additional user-interface configured to allow the user to control an additional functionality of the system provided exclusively through physical contact with the additional user-interface;

wherein the detector sub-system is operative to inactivate user control of the primary functionality of the system via the contactless user-interface upon detecting the user approaching the additional user-interface in a pre-determined manner, and wherein the contactless user-interface is configured for resetting the functionality of the functional state before starting to control the functionality upon the user touching or otherwise interacting with the additional user interface.

2. The system of claim 1, wherein the user-feedback sub-system is configured for dynamically adjusting the acknowledgement under control of the detector sub-system tracking the user within the alert range, or wherein the user-feedback sub-system is configured for dynamically adjusting the control feedback under control of the detector sub-system tracking the user within the alert range.

3. A non-transitory computer-readable storage medium comprising any medium that is not a transitory propagating signal and having stored thereon instructions that when executed cause processing circuitry of a contactless user-interface to:
- implement operation of a contactless user-interface of a system in an alert mode;
- implement operation of the contactless user-interface of the system in a control mode;
- control a user-feedback sub-system to provide a detection acknowledgement to the user, in response to a detector sub-system detecting a presence of a user within a pre-determined alert range;
- control the user-feedback sub-system to provide visual operational related information to the user about the functioning of the system in operational use;
- initiate a transition of the contactless user-interface from the alert mode to the control mode in response to the detector sub-system indicating a detection of a pre-determined initialization gesture made by the user within the pre-determined alert range;
- wherein the transition comprises replacing the operational related information being displayed on the display monitor by a dedicated graphical indication to acknowledge to the user that the user's presence has been detected;
- control a primary functionality of the system in response to the detector subsystem detecting a pre-determined control gesture of the user carried out within the pre-determined alert range,
- wherein the user-feedback sub-system is configured to provide to the user control feedback on a change in a status of the functionality in response to the pre-determined control gesture,
- inactivate control of the functionality of the system via the contactless user-interface upon the detector sub-system detecting the user approaching the additional user-interface in a pre-determined manner, and
- wherein the additional user-interface is configured to allow the user to control an additional functionality of the system through physical contact with the additional user-interface, and
- wherein the contactless user-interface is operative to reset the functionality to the functional state before starting to control the functionality upon the user touching or otherwise interacting with the additional physical user interface.

4. The control software of claim 3, wherein the second instructions comprise sixth instructions for controlling the user-feedback sub-system to provide to the user control feedback on a change in a status of the functionality in response to the pre-determined control gesture, or wherein the first instructions comprise seventh instructions for control of the user-feedback sub-system for dynamically adjusting the acknowledgement under control of the detector sub-system tracking the user within the alert range, or wherein the second instructions comprise ninth instructions for controlling the user-feedback sub-system to dynamically adjust the control feedback under control of the detector sub-system tracking the user within the alert range.

5. A method of enabling a user to control a functionality of a system through contactless interaction with the system, the method comprising:
- in an alert mode process, providing a detection acknowledgement to the user, in response to detecting a presence of the user within a pre-determined alert range, wherein said detection acknowledgement comprises replacing operational related information being displayed on a display monitor related to the operational use of the system by a dedicated graphical indication to acknowledge to the user that the user's presence has been detected;
- transitioning from the alert mode process to a control mode process in response to detecting a pre-determined initialization gesture made by the user within the pre-determined alert range; and
- in the control mode process:
  - controlling the functionality of the system in response to detecting a pre-determined control gesture of the user carried out within the pre-determined alert range,
- providing to the user control feedback on a change in a status of the functionality in response to the pre-determined control gesture via a feedback sub-system,
- controlling an additional functionality of the system through the user's physical contact with an additional user-interface of the system;
- inactivating the control mode process upon detecting the user approaching the additional user-interface in a pre-determined manner, and
- resetting the functionality of the system to the functional state before starting to control the functionality upon the user touching or otherwise interacting with the additional physical user interface.

6. The method of claim 5, further comprising:
- in the control mode process, providing to the user control feedback on a change in a status of the functionality in response to the pre-determined control gesture, or
- in the alert mode process, dynamically adjusting the acknowledgement under control of tracking the user within the alert range, or otherwise dynamically adjusting the control feedback under control of tracking the user within the alert range in the control mode process.

7. A client computing device in a system adapted to execute an application program that presents a user-interface, wherein the user-interface comprises a contactless user-interface configured for a user's controlling a functionality of the system through contactless interaction with the contactless user-interface, said user-interface comprising:
- a detector sub-system and a user-feedback sub-system;
- wherein the contactless user-interface is configured to operate in one of:
- an alert mode and a control mode;
  - in the alert mode, the contactless user-interface is configured to control the user-feedback sub-system to provide a detection acknowledgement to the user, in response to the detector sub-system detecting a presence of the user within a pre-determined alert range;
  - the contactless user-interface being further configured to transition from the alert mode to the control mode in response to the detector sub-system detecting a pre-determined initialization gesture made by the user within the pre-determined alert range; and
  - in the control mode, the contactless user-interface being configured to control the functionality in response to the detector subsystem detecting a pre-determined control gesture of the user carried out within the pre-determined alert range,
  - wherein the user-feedback sub-system is configured to provide to the user control feedback on a change in a status of the functionality in response to the pre-determined control gesture, an additional physical user-interface, different from the contactless user-interface, the additional physical user-interface configured to allow the user to control an additional functionality of the system through physical contact with the additional user-interface;

wherein the detector sub-system is operative to inactivate the user controlling the functionality via the contactless user-interface upon detecting the user approaching the additional physical user-interface in a pre-determined manner, and wherein the contactless user-interface is operative to reset the functionality of the system to the functional state before starting to control the functionality upon the user touching or otherwise interacting with the additional physical user interface.

8. The user-interface of claim 7, wherein the user-feedback sub-system is configured to:
provide to the user control feedback on a change in a status of the functionality in response to the pre-determined control gesture, or
dynamically adjust the acknowledgement under control of the detector sub-system tracking the user within the alert range, or
dynamically adjust the control feedback under control of the detector sub-system tracking the user within the alert range.

9. The system according to claim 1, wherein the system detector sub-system is configured to detect a main vector component of a vector representing a gesture of the user as a directed path within the pre-determined alert range, wherein if the directed path lies in the direction from the user towards the additional user-interface, and if a rate of change of this main vector component exceeds a pre-determined threshold magnitude, the detector sub-system is further configured to interpret a movement or a gesture as corresponding to the user reaching for the additional physical user-interface.

10. The system according to claim 1, wherein the system has one or more functionalities that can be controlled by the user via the contactless user-interface, and wherein the directed path of any respective one of the pre-determined control gestures for the one or more functionalities does not have a vector component in the direction from the user towards the additional user-interface.

11. The system according to claim 1, wherein the contactless user-interface is configured for resetting the system functionality to a prior functionality state associated with a time prior to the user starting to control the system functionality, wherein the resetting occurs substantially upon the user touching, or otherwise interacting with the additional physical user-interface.

12. The system according to claim 1, wherein the system is configured such that if the directed path of a particular one of the pre-determined control gestures has a main vector component along said direction, the contactless user-interface is configured in such a way that the functionality associated with this particular pre-determined control gesture is not a critical functionality.

13. The system according to claim 1, wherein the additional user-interface comprises one or more buttons, and/or one or more dials, and/or one or more sliders, and/or one or more levers, and/or a touch screen.

14. The system according to claim 1, wherein a primary functionality of the system is user-controllable via the contactless user-interface, and a secondary functionality of the system is user-controllable via the additional user-interface, wherein the primary functionality can be different or the same as the secondary functionality.

15. The system according to claim 1, wherein the user-feedback sub-system is configured to respond differently to a same pre-determined control gesture, according to whether the control gesture carried out in different control sectors within the alert range.

16. The system according to claim 1, wherein the step of providing an acknowledgment to the user in the user-feedback sub-system further comprises displaying on a display monitor, the acknowledgment to the user as a figurative object.

17. The system according to claim 1, wherein the step of providing an acknowledgment to the user in the user-feedback sub-system further comprises displaying on a display monitor, the acknowledgment to the user as a graphics object.

18. The system according to claim 17, wherein the user-feedback sub-system controls the graphics object to move in unison with the user.

19. The system according to claim 17, wherein the user-feedback sub-system morphs a previously displayed graphics object into a different graphics object indicative of detecting a predetermined initialization gesture of the user within the predetermined alert range.

20. The system of claim 1, wherein said dedicated graphical indication comprises fading out the information displayed in operation use of the system and fading in the dedicated information.

21. The system of claim 1, wherein said dedicated graphical indication comprises morphing the information displayed in operational use of the system into the dedicated information.

* * * * *